(12) United States Patent
Hou

(10) Patent No.: US 10,988,872 B2
(45) Date of Patent: Apr. 27, 2021

(54) METHOD FOR MANUFACTURING NEEDLE WALLS ASSEMBLY OF CIRCULAR KNITTING MACHINE

(71) Applicant: Ku-Ching Hou, New Taipei (TW)

(72) Inventor: Ku-Ching Hou, New Taipei (TW)

( * ) Notice: Subject to any disclaimer, the term of this patent is extended or adjusted under 35 U.S.C. 154(b) by 0 days.

(21) Appl. No.: 15/950,252

(22) Filed: Apr. 11, 2018

(65) Prior Publication Data

US 2018/0298532 A1    Oct. 18, 2018

(30) Foreign Application Priority Data

Apr. 14, 2017    (TW) ................... 106112673

(51) Int. Cl.
| | | |
|---|---|---|
| *D04B 9/02* | (2006.01) | |
| *D04B 15/18* | (2006.01) | |
| *B23P 17/04* | (2006.01) | |
| *B23P 15/00* | (2006.01) | |
| *B23C 3/00* | (2006.01) | |

(52) U.S. Cl.
CPC ............... *D04B 9/02* (2013.01); *B23P 15/00* (2013.01); *B23P 17/04* (2013.01); *D04B 15/18* (2013.01); *B23C 3/00* (2013.01)

(58) Field of Classification Search
CPC .......... D04B 9/02; D04B 15/14; D04B 15/18; B23P 15/00; B23P 17/04; B23C 3/00
See application file for complete search history.

(56) References Cited

U.S. PATENT DOCUMENTS

| | | | | |
|---|---|---|---|---|
| 1,850,817 A | * | 3/1932 | Swinglehurst | D04B 15/10 66/115 |
| 3,817,058 A | * | 6/1974 | Lombardi | D04B 15/10 66/8 |
| 4,571,957 A | * | 2/1986 | Engelfried | D04B 15/18 66/115 |
| 5,577,401 A | * | 11/1996 | Pernick | D04B 15/14 29/525 |
| 5,609,044 A | * | 3/1997 | Tacy | D04B 15/14 66/114 |

* cited by examiner

*Primary Examiner* — Ryan A Reis

(57) ABSTRACT

A method includes the steps of: a) providing a needle bed body and insertion sheets, wherein the needle bed body is provided with slots, the needle bed body has a first datum plane and a second datum plane, each insertion sheet has a first and second portions at two ends thereof and corresponding to the first datum plane and the second datum plane; b) measuring sizes of the inserting sheets and the bottom of the slot and milling each slot when needed; c) measuring sizes of the first datum plane and second datum plane and machining the first and second datum planes when needed; and d) inserting the insertion sheets into the slots with making the first and second portions attached on the first and second datum planes, respectively.

9 Claims, 4 Drawing Sheets

US 10,988,872 B2

METHOD FOR MANUFACTURING NEEDLE WALLS ASSEMBLY OF CIRCULAR KNITTING MACHINE

BACKGROUND OF THE INVENTION

1. Technical Field

The invention relates to circular knitting machines, particularly to manufacture of needle walls assembly of a circular knitting machine.

2. Related Art

Circular knitting machines are equipment for mass-producing knitted fabric. A currently existing circular knitting machine, especially for a fine needle knitting machine with much more needles, has a needle bed (cylinder/dial/sinker ring) with needle guiding slots which has a large amount and tiny width, so the slots are hard to be formed and processed. Usually, roughly finished products have problems of insufficient accuracy, surface roughness or wear resistance because of subsequent processing (post-processing).

Please refer to FIGS. 1-4. A typically conventional manufacturing method of needle walls assembly of a circular knitting machine machines a needle bed body 1*a* to form a required shape first. Then the needle bed body 1*a* is cut to form a plurality of slots 19*a*. A channel 16*a* over the needle bed body 1*a* is formed between two adjacent slots 19*a*. The bottom of the slot 19*a* serves as a joint datum plane 23*a*. Finally, the insertion sheets 2*a* are separately inserted into the slots 19*a* one by one.

The needle bed body 1*a* associated with the inserting sheets 2*a* is known as a needle wall.

However, the bottoms of the slots 19*a* are always deformed by the heat treatment. Even if the insertion sheets 2*a* are inserted very carefully, their non-grinding accuracy and an external size still greatly exceeds a required range of standard tolerance. As a result, the conventional post-processing is to grind a plate such as an insertion sheet 2*a* to become a sheet with required accuracy and an external size and then use a polisher to perform deburring and/or polishing and sandblast grinding processes. Its target is to improve surface smoothness of the needle wall so as to reduce friction of actions of knitting needles.

However, two sides of the insertion sheet 2*a* is ground, so round corners of the insertion sheet 2*a* become right-angled ones 22*a*. This will make the knitting needles worn down when the knitting machine operates. When its burrs are not completely removed, the high-speed acting components such as knitting needles and sinker plates may raise problems of needle tension, needle jam or damage of needle wall. Such interference of components will cause not only quality reduction such as yarn forking, fracture or fluffing but also fast wearing down of components, or even malfunction of whole machine. The conventional post-processing is time-consuming and laborious, especially for removal of burrs.

In detail, after the needle bed body 1*a* has been processed with heat treatment, the lathing tolerance of parallelism from point A to point B will be enlarged from original about 0.01 mm to 0.1 mm or even above 0.35 mm because of heat treatment errors and inconsistence of thickness specification of the needle bed body 1*a*. As a result, the bottom of the slot 19*a* is also deformed by the milling process. Further, there is a combination tolerance of the height H2 and the corresponding portion 231*a* of the insertion sheet 2*a*. Thus, when the needle walls have been assembled by the conventional method, the parallelism from point A2 to point B2 of the insertion sheet 2*a* also becomes 0.15 mm or even above 0.5 mm. This exceeds the specification standard (below 0.03 mm) very much. As a result, the conventional method reserves a deflection gradient between point A and point B during the lathing process so as to reduce interference of heat treatment and keep the parallelism between point A and point B to meet the specification standard after the heat treatment. After assembling is finished, grind the top of the needle wall to make both the section between point A2 and point B2 and the section between point A and point B be a synchronization tolerance and to keep the height H1 of the slot to meet the specification standard.

SUMMARY OF THE INVENTION

An object of the invention is to provide a method for manufacturing needle walls assembly of a circular knitting machine, which can eliminate the machining processes such as grinding of precision and dimensions, deburring and polishing, etc. In addition, it can also reduce the resistance abrasion between needle walls and the knitting needles. The serve lifespan of the knitting needles and the needle walls can be lengthened, and the machine knitting speed can be increased so as to improve the productivity.

To accomplish the above object, the invention provides a method for manufacturing needle walls assembly of circular knitting machine, which includes the steps of:

a) providing a needle bed body and insertion sheets, wherein the needle bed body is provided with slots, the needle bed body is introduced with a heat treatment deformation coefficient to keep a first datum plane for knitting needles and a second datum plane for needle walls, bottoms of the slots are milled to exceed a range of the heat treatment deformation coefficient, each of the insertion sheets has a first portion at an end thereof, a second portion at another end thereof and a third portion between the first portion and the second portion, the first portion and the second portion correspond to the first datum plane and the second datum plane, respectively, and the first portion, the second portion and non-grinding accuracy and an external size of each insertion sheet are controlled within a tolerance range;

b) measuring sizes of the inserting sheets and the bottom of the slot;

c) milling each slot when the size of the bottom of the slot measured in step b) are below a first standard to prevent the third portions from touching the bottoms of the slots;

d) after heat treatment, measuring sizes of the first datum plane and second datum plane;

e) machining the first datum plane and second datum plane when the sizes measured in step d) do not meet a second standard; and f) inserting the insertion sheets into the slots one by one with making the first portion and the second portion closely attached on the first datum plane and second datum plane, respectively.

DETAILED DESCRIPTION OF THE INVENTION

Figure 1:
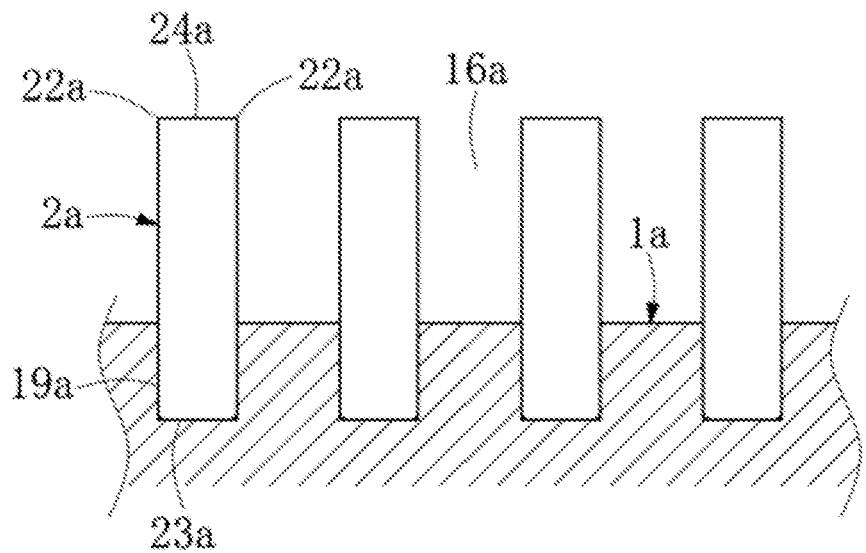
FIG. 1 is a cross-sectional view of a conventional needle walls assembly.
Figure 2:
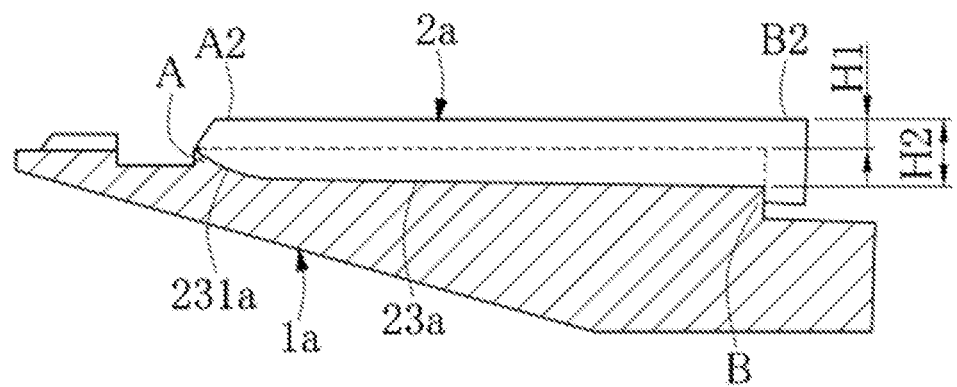
FIG. 2 is another cross-sectional view of the conventional needle walls assembly.
Figure 3:
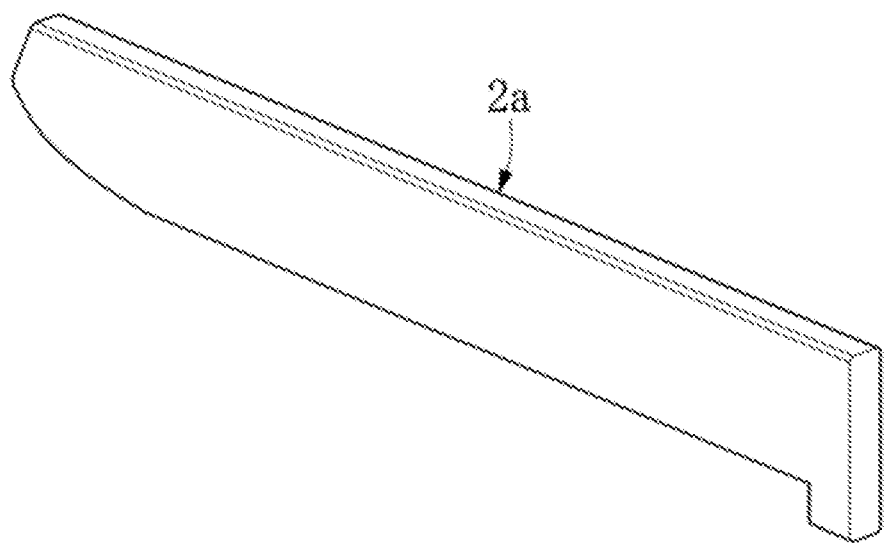
FIG. 3 is a perspective view of a conventional insertion sheet of the conventional needle walls assembly.
Figure 4:
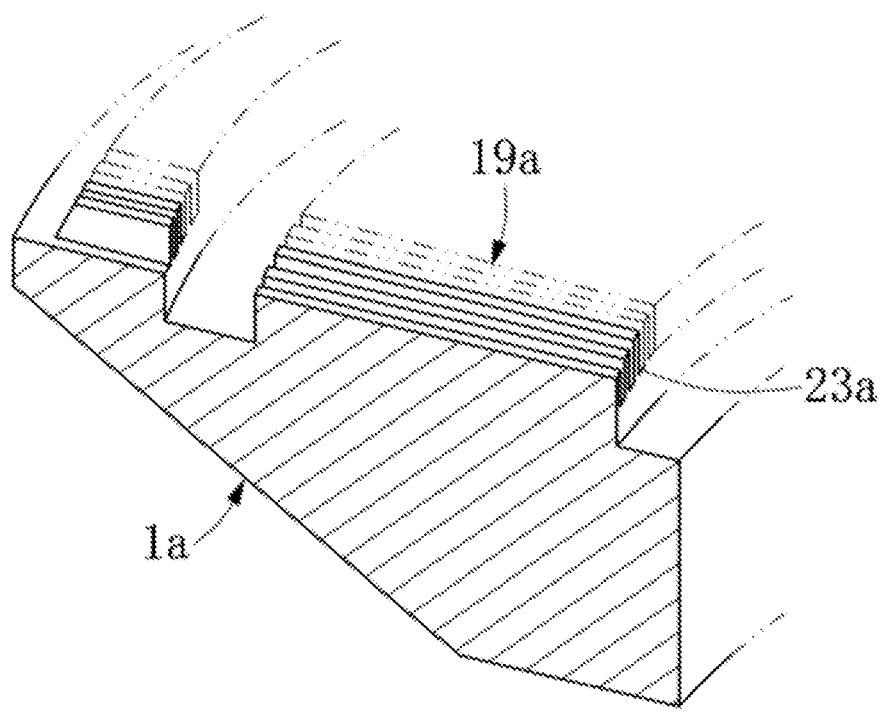
FIG. 4 is a perspective view of the conventional needle walls assembly.
Figure 5:
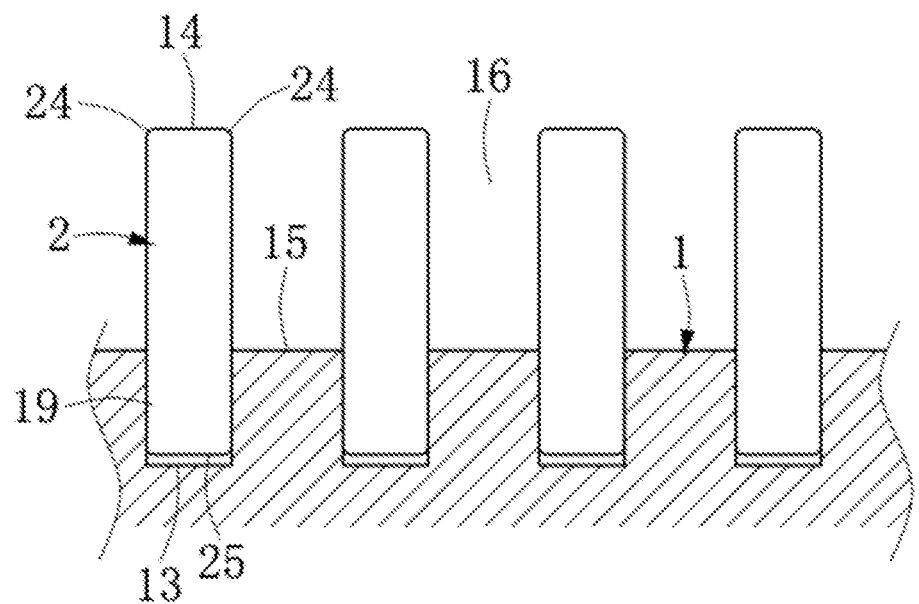
FIG. 5 is a is a cross-sectional view of the needle walls assembly of the invention.

Please refer to FIGS. 5-8. The invention provides a method for manufacturing needle walls assembly of circular knitting machine, which includes the steps as follows.

First, provide a needle bed body 1 and insertion sheets 2. The needle bed body 1 is provided with slots 19 at predetermined positions at regular intervals and a channel 16 is formed between two adjacent slots 19. The needle bed body 1 is introduced with a heat treatment deformation coefficient to reserve a correctable size range of a first datum plane 15 for knitting needles and a second datum plane 17 for needle walls. That is, the second datum plane 17 may be disposed on a platform 18 of the needle bed body 1. The platform 18 protrudes from the needle bed body 1 to form a step shape.

The bottom 13 of the slot 19 is milled to exceed a range of the heat treatment deformation coefficient to guarantee a first portion 21 of the insertion sheet 2 corresponding to the first datum plane 15 and a second portion 22 of the insertion sheet 2 corresponding to the second datum plane 17 to be able to firmly be attached on the first datum plane 15 and the second datum plane 17, respectively.

Grinding accuracy and an external size is introduced into design and manufacture of the insertion sheet 2. The insertion sheet 2 is formed by punch machining. The insertion sheet 2 has a first portion 21 at an end (front end) thereof, a second portion 22 at another end (rear end) thereof and a third portion 23 between the first portion 21 and the second portion 22. The bottoms of the first portion 21 and the second portion 22 may be flat planes or curved surfaces. The bottom of the second portion 22 is lower than the bottom of the first portion 21 in level height. The bottom of the third portion 23 may be a flat plane or curved surface. The first portion 21 and the second portion 22 correspond to the first datum plane 15 and the second datum plane 17, respectively. It should be noted that the first portion 21 and the second portion 22 and non-grinding accuracy and an external size 14 of the insertion sheet 2 have to be controlled within a tolerance range.

Next, measure sizes of the inserting sheet 2 and the bottom 13 of the slot 19 (the first slot). Milt the bottom 13 of the first slot 19 when needed and mill the other slots 19 according to the specification to guarantee the third portion 23 of the insertion sheet 2 not to touch the bottom 13 of the slot 19. That is, the first portion 21 and the second portion 22 being firmly attached on the first datum plane 15 and the second datum plane 17 respectively can be confirmed again.

After heat treatment, measure sizes of the first datum plane 15 and second datum plane 17 and machine the first datum plane 15 and second datum plane 17 when needed. That is, selectively machining according to requirements is performed to make it be within an accurate tolerance range. As a result, an accurate non-grinding accuracy and an external size 14 can be obtained.

Next, insert the insertion sheets 2 into the slots 19 one by one with making the first portion 21 and the second portion 22 closely attached on the first datum plane 15 and second datum plane 17, respectively. The third portion 23 of the insertion sheet 2 does not touch the bottom 13 of the slot 19 so as to form a gap 25 between the third portion 23 and the slot bottom 13. Preferably, a width of the gap 25 is above 0.1 mm.

After assembling, measure non-grinding accuracy and the external size 14. They have to be controlled within an accurate tolerance range with keeping two top angles of the insertion sheet 2 to be round angles 24.

Figure 6:
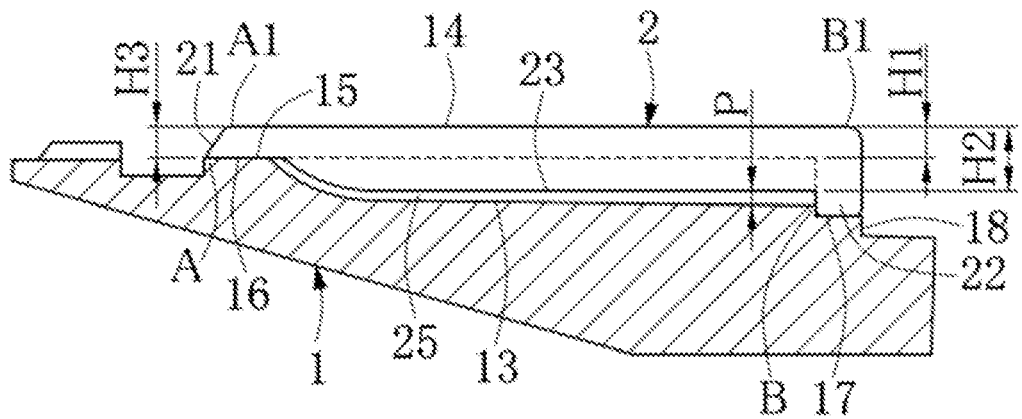
FIG. 6 is another cross-sectional view of the needle walls assembly of the invention.
Figure 7:
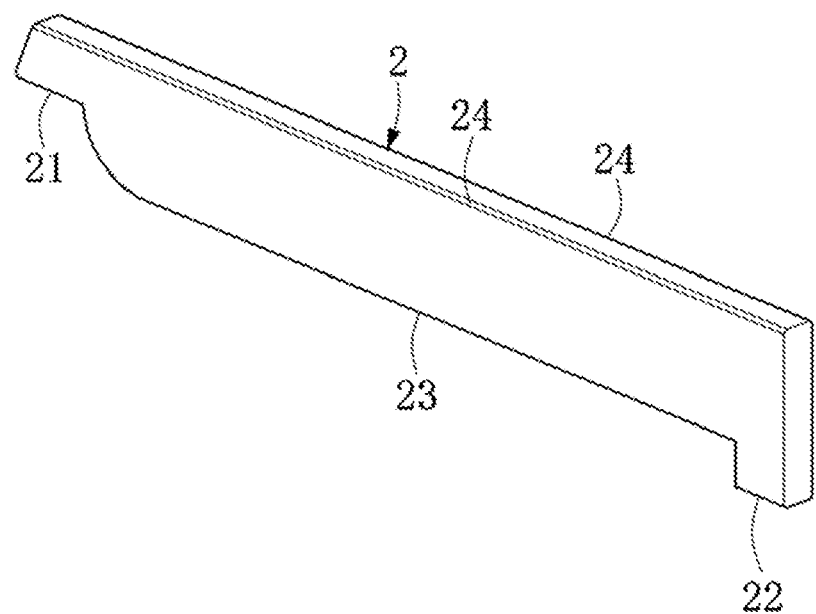
FIG. 7 is a perspective view of a conventional insertion sheet of the invention.
Figure 8:
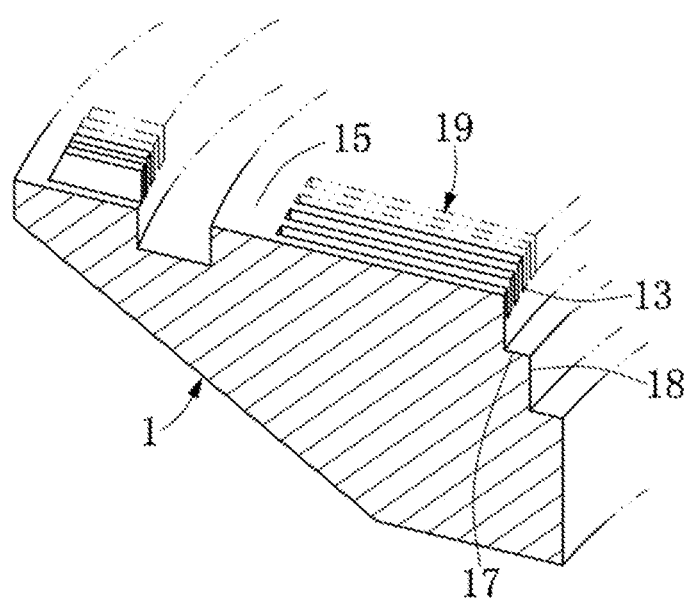
FIG. 8 is a perspective view of the needle walls assembly of the invention.

As shown in FIG. 6, section between points A and B is a datum plane of excluding deformation interference of the invention. Because section between point B and the second datum plane 17 is a dropping step, its step height will not be affected by heat deformation. As a result, the second datum plane 17 is a datum plane of excluding deformation interference of the invention. In addition, height H3 of the first portion 21 of the insertion sheet 2 is fixed when forming.

When the parallelism between points A and B has been confirmed within the specification standard after heat treatment and assembling has been finished, the parallelism between points A1 and B1 and section between points A and B will become a synchronization tolerance, and slot heights of the section between points A and A1 and the section between points B and B1 can also be confirmed to meet the specification standard.

While this invention has been described by way of examples and in terms of preferred embodiments, it is to be understood that this invention is not limited hereto, and that various changes, substitutions, and alterations can be made herein without departing from the spirit and scope of this invention as defined by the appended claims.

What is claimed is:

1. A method for manufacturing needle walls assembly of circular knitting machine, comprising:
    a) providing a needle bed body and insertion sheets, wherein the needle bed body is provided with slots, the needle bed body is introduced with a heat treatment deformation coefficient to keep a first datum plane for knitting needles and a second datum plane for needle walls, bottoms of the slots are milled to exceed a range of the heat treatment deformation coefficient, each of the insertion sheets has a first portion at an end thereof, a second portion at another end thereof and a third portion between the first portion and the second portion, the first portion and the second portion correspond to the first datum plane and the second datum plane, respectively, and the first portion, the second portion and an external size of each insertion sheet are controlled within a tolerance range;
    b) measuring sizes of the insertion sheets and the bottoms of the slots;
    c) milling each slot when anyone of the sizes of the bottoms of the slots measured in step b) is below a first standard to prevent the third portions from touching the bottoms of the slots;
    d) after heat treatment, measuring sizes of the first datum plane and second datum plane;
    e) machining the first datum plane and second datum plane when the sizes measured in step d) do not meet a second standard; and
    f) inserting-the insertion sheets into the slots one by one with making the first portion and the second portion closely attached on the first datum plane and second datum plane, respectively.

2. The method of claim 1, wherein the second datum plane is disposed on a platform of the needle bed body, and the platform protrudes from the needle bed body to form a step shape.

3. The method of claim 1, wherein a gap is formed between the third portion of the insertion sheet and the bottom of the slot.

4. The method of claim 3, wherein a width of the gap is above 0.1 mm.

5. The method of claim 1, wherein a bottom of the second portion is lower than a bottom of the first portion in level height.

6. The method of claim 5, wherein the bottoms of the first and second portions are flat planes.

7. The method of claim 1, wherein the insertion sheet is formed by punch machining.

8. The method of claim 1, wherein two top angles of the insertion sheet are round angles after assembling has been finished.

9. The method of claim 1, wherein the second datum plane is disposed on a platform of the needle bed body, the platform protrudes from the needle bed body to form a step shape, and a gap is formed between the third portion of the insertion sheet and the bottom of the slot.

\* \* \* \* \*